United States Patent [19]

Itoh et al.

[11] Patent Number: 4,694,053

[45] Date of Patent: * Sep. 15, 1987

[54] METHOD FOR THE POLYMERIZATION OF VINYL CHLORIDE MONOMER IN AN AQUEOUS MEDIUM

[75] Inventors: Kenichi Itoh, Clute, Tex.; Genji Noguki, Yamaguchi, Japan; Motoaki Tanaka; Hitoshi Ohba, both of Saitama, Japan

[73] Assignee: Shin-Etsu Chemical Co., Ltd., Tokyo, Japan

[*] Notice: The portion of the term of this patent subsequent to Sep. 15, 2004 has been disclaimed.

[21] Appl. No.: 748,433

[22] Filed: Jun. 25, 1985

[51] Int. Cl.$^4$ ............................................. C08L 37/00
[52] U.S. Cl. ................................. 526/74; 526/201; 526/203; 526/344.2; 526/345; 525/246; 525/301
[58] Field of Search ............... 526/201, 203, 344.2, 526/345, 74; 525/246, 301

[56] References Cited

U.S. PATENT DOCUMENTS

| | | | |
|---|---|---|---|
| 2,772,258 | 11/1956 | Mangelli | 526/203 |
| 2,886,552 | 5/1959 | Helligmann et al. | 526/201 |
| 3,488,328 | 1/1970 | Koyanagi et al. | 526/201 |
| 3,907,730 | 9/1975 | Jones | 526/201 |
| 3,966,696 | 6/1976 | Kidoh et al. | 526/201 |
| 4,228,264 | 10/1980 | Yamamoto et al. | 526/201 |
| 4,360,651 | 11/1982 | Dinbergs | 526/88 |
| 4,377,672 | 3/1983 | Geschonke et al. | 526/203 |

Primary Examiner—Joseph L. Schofer
Assistant Examiner—J. M. Reddick
Attorney, Agent, or Firm—Hopgood, Calimafde, Kalil, Blaustein & Judlowe

[57] ABSTRACT

The invention provides an improvement in the suspension polymerization of vinyl chloride in an aqueous medium in the presence of a monomer-soluble polymerization initiator, according to which the amount of polymer scale deposition on the reactor walls can be greatly decreased. The improvement comprises admixing the aqueous polymerization medium with (a) a water-soluble crosslinked copolymer of an unsaturated carboxylic acid monomer, e.g. acrylic acid, and a crosslinking monomer such as di(methyl)allyl ether of diethyleneglycol and (b) a non-ionic surface active agent in combination.

4 Claims, No Drawings

METHOD FOR THE POLYMERIZATION OF VINYL CHLORIDE MONOMER IN AN AQUEOUS MEDIUM

BACKGROUND OF THE INVENTION

The present invention relates to an improved method for the polymerization of vinyl chloride monomer in an aqueous medium or, more particularly, to a method for the polymerization of vinyl chloride in an aqueous medium, which method is outstandingly freed from the problem of the polymer scale deposition on the inner walls of the polymerization reactor and surfaces of stirrer and other parts coming into contact with the monomer during the polymerization reaction.

Needless to say, the most widely undertaken method for the polymerization of vinyl chloride or a monomer mixture mainly composed of vinyl chloride is the suspension polymerization of the monomer or monomer mixture in an aqueous medium in the presence of a monomer-soluble polymerization initiator. As is well known, one of the serious problems in the suspension polymerization of vinyl chloride or the like monomer is the deposition of polymer scale on the inner walls of the polymerization reactor and surfaces of the stirrer and other parts coming into contact with the monomer during the polymerization reaction. Once the inner walls of the polymerization reactor have been covered by the polymer scale deposited thereon, the cooling capacity of the polymerization reactor is greatly decreased resulting in the decrease in the productivity and the polymer scale coming off the reactor walls is eventually intermixed with the polymer product to cause degradation of the product quality. In addition, the polymer scale deposited on the surfaces must be removed to prepare for the next run of the polymerization taking a great deal of labor and time while such a cleaning work of the reactor involves a very serious porblem of the workers' health due to the toxicity of the vinyl chloride monomer absorbed in the polymer scale in a considerably large amount.

One of the approaches for preventing polymer scale deposition in the suspension polymerization of vinyl chloride is to provide the reactor walls with a coating of certain compounds insusceptible to the deposition of the polymer scale. Various types of coating materials have been proposed hitherto including polar organic compounds such as amines, quinones, aldehydes and the like, dyes and pigments, reaction products of a polar organic compound or dye with a metal salt, mixtures of an electron donor compound and an electron acceptor compound, inorganic salts or complex compounds, and others.

Besides the above mentioned methods by providing the reactor walls with a coating layer, attempts have been made to decrease the polymer scale deposition by the modification of the recipe of the polymerization mixture introduced into the polymerization reactor. For example, Japanese Patent Kohyo Nos. 57-5000614 and 57-500650 teach admixture of the aqueous medium for the suspension polymerization of vinyl chloride with a dispersing agent which is a water-insoluble crosslinked polymer prepared by the crosslinking copolymerization of acrylic acid and a crosslinkable monomer such as allyl pentaerithritol, allyl saccharose and the like. This method, however, is not quite satisfactory in respect of the rather low effectiveness of the method for the prevention of polymer scale deposition.

SUMMARY OF THE INVENTION

It is therefore an object of the present invention to provide a novel and convenient method for the suspension polymerization of vinyl chloride monomer in an aqueous medium, which is outstandingly freed from the problem of polymer scale deposition on various surfaces coming into contact with the monomer during the polymerization reaction.

Another object of the invention is to provide an improvement in the suspension polymerization of vinyl chloride, according to which the amount of polymer scale deposition on the reactor walls can be greatly decreased by the admixture of the aqueous polymerization medium with a specific additive compound.

Thus, the improvement provided by the present invention comprises, in the suspension polymerization of vinyl chloride monomer in an aqueous medium in the presence of a monomer-soluble polymerization initiator, admixing the aqueous medium with:

(a) a water-soluble crosslinked copolymer of a polymerizable unsaturated carboxylic acid compound and a crosslinking agent represented by the general formula

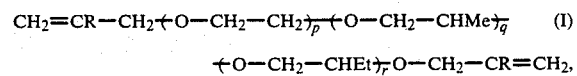

$$CH_2=CR-CH_2+O-CH_2-CH_2)_p+O-CH_2-CHMe)_q \quad (I)$$
$$+O-CH_2-CHEt)_rO-CH_2-CR=CH_2,$$

in which Me is a methyl group, Et is an ethyl group, R is a hydrogen atom or a methyl group and p, q and r are each zero or a positive integer with the proviso that $p+q+r$ is a positive integer not exceeding 500; and (b) a non-ionic surface active agent.

The above mentioned polymerizable unsaturated carboxylic acid is typically acrylic acid and the crosslinking agent represented by the general formula (I) is typically bisallyl or bismethallyl ether of diethyleneglycol.

DETAILED DESCRIPTION OF THE PREFERRED EMBODIMENTS

As is understood from the above description, the improvement provided by the invention comprises admixture of a specific crosslinked water-soluble copolymer and a non-ionic surface active agent in combination. The copolymer is obtained by the copolymerization of a polymerizable unsaturated carboxylic acid compound and a crosslinking agent represented by the general formula (I) in which each symbol has the meaning as defined above. Each of the suffixes p, q and r is zero or a positive integer by definition although it can be a number with a fraction as an average value.

Exemplary of the crosslinking agent of the formula (I) are: diethyleneglycol bisallyl ether, i.e. a compound of the formula (I) in which R is a hydrogen atom, $p=2$, $q=0$ and $r=0$; diethyleneglycol bismethallyl ether, i.e. a compound of the formula (I) in which R is a methyl group, $p=2$, $q=0$ and $r=0$; a compound of the formula (I) in which R is a methyl group, $p=4.5$ on an average, $q=0$ and $r=0$; a compound of the formula (I) in which R is a hydrogen atom, $p=8$, $q=2.6$ on an average and $r=0$; a compound of the formula (I) in which R is a hydrogen atom, $p=0$, $q=17$ and $r=0$; a compound of the formula (I) in which R is a methyl group, $p=0$, $q=2.6$ on an average and $r=0$; and the like. These crosslinking agents can be used either singly or as a combination of two kinds or more according to need.

Exemplary of the polymerizable unsaturated carboxylic acid compound are: acrylic acid; methacrylic acid; itaconic acid; chloroacrylic acid; cyanoacrylic acid; α-phenylacrylic acid; α-benzylacrylic acid; crotonic acid; maleic acid; fumaric acid; sorbic acid; and the like. These polymerizable carboxylic acids can be used either singly or as a combination of two kinds or more according to need.

The crosslinking agent of the general formula (I) is copolymerized with the unsaturated carboxylic acid in an amount from 0.05 to 10 parts by weight or, preferably, from 0.5 to 5 parts by weight per 100 parts by weight of the unsaturated carboxylic acid. When the amount of the crosslinking agent is smaller than above, the degree of crosslinking in the resultant copolymer is too small so that the desired effect of preventing polymer scale deposition may be insufficient while a copolymer prepared with a too large amount of the crosslinking agent is no longer soluble in water due to the excessive degree of crosslinking so that such a copolymer is not suitable for use in the inventive method.

It is essential that the above described water-soluble crosslinked copolymer is added to the aqueous polymerization medium in combination with a non-ionic surface active agent. Exemplary of the non-ionic surface active agent suitale in the inventive method are: polyoxyethylene alkyl ethers; polyoxyethylene alkyl phenyl ethers; polyoxyethylene polystyryl phenyl ethers; polyoxyethylene polyoxypropylene block copolymers; partial esters of glycerin with a fatty acid; partial esters of sorbitan with a fatty acid; partial esters of pentaerithritol with a fatty acid; monoesters of propyleneglycol with a fatty acid; partial esters of saccharose with a fatty acid; partial esters of polyoxyethylene sorbitan with a fatty acid; partial esters of polyoxyethylene sorbitol with a fatty acid; partial esters of polyoxyethylene glycerin with a fatty acid; fatty acid esters of polyethyleneglycol; partial esters of polyglycerin with a fatty acid; polyoxyethylene adducts of castor oil; fatty acid diethanolamides; N,N-bis(2-hydroxyalkyl) amines; polyoxyethylene alkylamines; fatty acid esters of triethanolamine; trialkylamine oxides; and the like. These non-ionic surface active agents can be used either singly or as a combination of two kinds or more according to need.

The amounts of the ingredients (a) and (b) added to the aqueous polymerization medium should be in the range from 0.01 to 2 parts by weight or, preferably, from 0.02 to 0.5 part by weight for the ingredient (a) and from 0.005 to 1 part by weight or, preferably, from 0.01 to 0.5 part by weight for the ingredient (b) each per 100 parts by weight of the vinyl chloride monomer or the monomer mixture disperssed in the aqueous medium. These amounts are critical in order that the monomer is dispersed in the aqueous medium in the form of very fine droplets having great stability to cause little deposition of the polymer scale during the polymerization reaction.

It is of course optional that the above described method of the present invention is undertaken in combination with the conventional method for the prevention of polymer scale deposition by providing a coating on the surface of the reactor walls and other surfaces with a known coating composition when further increased effects of polymer scale prevention is desired. Suitable coating compositions include those disclosed in Japanese Patent Publications Nos. 45-30343, 45-30835, 56-5442, 56-5443, 56-5444 and others. Particularly preferable as the coating material are polar organic compounds such as dyes, e.g. direct dyes, acidic dyes, basic dyes, vat dyes, sulfur dyes, mordant dyes, disperse dyes, oil-soluble dyes, reactive dyes and the like, amine compounds, quinone compounds, aldehyde compounds and the like, of which the organic dyes having one or more azine rings in the molecule are particularly satisfactory.

Like conventional procedures for the suspension polymerization of vinyl chloride monomer, the polymerization reaction according to the invention is carried out in the presence of a monomer-soluble polymerization initiator. The type of the monomer-soluble polymerization initiator is not particularly limitative and exemplary of the initiators usable in the inventive method are organic peroxides such as diisopropyl peroxy dicarbonate, di-2-ethylhexyl peroxy dicarbonate, acetyl cyclohexyl sulfonyl peroxide, tert-butyl peroxy pivalate, benzoyl peroxide, lauroyl peroxide and the like and azo compounds such as azobisisobutyronitrile, azobis-2,4-dimethyl valeronitrile, azobis-4-methoxy-2,4-dimethyl valeronitrile and the like.

The method of the present invention is applicable not only to the homopolymerization of vinyl chloride but also to the copolymerization of vinyl chloride with one or more of other copolymerizable monomers known in the art. Several examples of such comonomers include vinyl esters, e.g. vinyl acetate, vinyl ethers, acrylic and methacrylic acids and esters thereof, maleic and fumaric acids and esters thereof, maleic anhydride, aromatic vinyl compounds, e.g. styrene, unsaturated nitrile compounds, e.g. acrylonitrile, vinylidene halides, e.g. vinylidene fluoride and vinylidene chloride, olefins, e.g. ethylene and propylene, and the like.

In practicing the method of the present invention, a further enhanced effect of polymer scale prevention can be obtained by admixing the aqueous medium with a small amount, e.g. 1% by weight or smaller, of a water-soluble basic or alkaline compound.

Excepting the addition of the above described ingredients (a) and (b) in combination to the aqueous polymerization medium, the polymerization reaction of the inventive method can be performed under rather conventional polymerization conditions including the amount of the polymerization initiator, temperature and length of time of the polymerization reaction and others.

In the following, the method of the invention is described in more detail by way of examples.

EXAMPLES 1 TO 5 AND COMPARATIVE EXAMPLES 1 AND 2

Into a stainless steel-made polymerization reactor of 100 liter capacity were introduced 60 kg of deionized water, 14 g of di-2-ethylhexyl peroxy dicarbonate as the polymerization initiator, 30 g of either one of the cross-linked copolymers I, II, III, IV and V indicated below and 30 g of either one of the non-ionic surface active agents I, II and III indicated below and, after evacuation of the reactor down to a pressure of 50 mmHg, 30 kg of vinyl chloride monomer were introduced thereinto to form a polymerization mixture which was heated up to a temperature of 57° C. under agitation to start the polymerization reaction.

When the pressure inside the polymerization reactor had dropped to 6.0 kg/cm$^2$G after about 6 hours from the start of the polymerization reaction, the reaction was terminated, the unreacted vinyl chloride monomer was recovered and the polymerizate slurry was discharged out of the reactor to examine the condition on the surface of the reactor walls in respect of the polymer scale deposition.

Taking the above described procedure of the polymerization as a run, the same cycle of the polymerization was repeated until deposition of polymer scale was found on the reactor walls by the visual examination and the number of runs thereto was recorded to give the results shown in Table 1 below.

Crosslinked copolymers

I: a copolymer prepared from 100 parts by weight of acrylic acid and 1 part by weight of diethyleneglycol bisallyl ether II: a copolymer prepared from 100 parts by weight of acrylic acid and 2 parts by weight of diethyleneglycol bisallyl ether III: a copolymer prepared from 100 parts by weight of acrylic acid and 2 parts by weight of diethyleneglycol bismethallyl ether IV: a copolymer prepared from 100 parts by weight of acrylic acid and 0.3 part by weight of allyl pentaerithritol V: a copolymer prepared from 100 parts by weight of acrylic acid and 1.3 parts by weight of allyl saccharose Non-ionic surface active agents I: sorbitan monolaurate (Span 20)

II: polyoxyethylene sorbitan monolaurate (Tween 20)

III: polyoxyethylene sorbitan monooleate (Tween 80)

EXAMPLES 6 TO 8

The inner walls of the same polymerization reactor as used in the preceding examples and the surface of the stirrer were coated with the coating material as indicated in Table 2 below in a coating amount of 0.001 g/m$^2$ as dried.

TABLE 1

| | Crosslinked copolymer | Non-ionic surface active agent | Number of runs to scale deposition |
|---|---|---|---|
| Example | | | |
| 1 | I | I | 12 |
| 2 | I | II | 15 |
| 3 | I | III | 16 |
| 4 | II | III | 14 |
| 5 | III | III | 10 |
| Comparative Example | | | |
| 1 | IV | III | 4 |
| 2 | V | III | 3 |

Then, 60 kg of deionized water, 16 g of a 1:1 by weight mixture of azobis-2,4-dimethyl valeronitrile and di-2-ethylhexyl peroxy dicarbonate as the polymerization initiator, 30 g of the crosslinked copolymer I used in the preceding examples and 30 g of the non-ionic surface active agent III used in the preceding examples were introduced into the polymerization reactor and, after evacuation of the reactor to exclude oxygen, 30 kg of vinyl chloride monomer were further added thereto to form a polymerization mixture which was heated to 57° C. under agitation to start the polymerization reaction. The reaction was terminated when the pressure inside the reactor had dropped to 6.0 kg/cm$^2$ after about 6 hours from the start of the reaction and the unreacted vinyl chloride monomer was recovered followed by discharging of the polymerizate slurry to visually examine the condition of the reactor walls.

The polymerization run as described above was repeated until deposition of polymer scale could be found on the reactor walls and the number of the repeated runs thereto was recorded to give the results shown in Table 2.

TABLE 2

| Example No. | 6 | 7 | 8 |
|---|---|---|---|
| Coating agent | Solvent Black 7 | Solvent Black 5 | Mixture of Acid Black 2 and phytic acid |
| Number of runs to scale deposition | 100 | 100 | 115 |

What is claimed is:

1. In a method for the suspension polymerization of vinyl chloride monomer or a monomer mixture mainly composed of vinyl chloride in an aqueous medium in the presence of a monomer-soluble polymerization initiator, an improvement which comprises admixing the aqueous medium with:

(a) a water-soluble crosslinked copolymer of 100 parts by weight of acrylic acid and from 0.05 to 10 parts by weight of bisallyl ether or bismethallyl ether of diethyleneglycol; and (b) a non-ionic surface active agent.

2. The improvement as claimed in claim 1 wherein the amount of the ingredient (a) added to the aqueous medium is in the range from 0.01 to 2 parts by weight per 100 parts by weight of the vinyl chloride monomer or the monomer mixture.

3. The improvement as claimed in claim 1 wherein the amount of the ingredient (b) addded to the aqueous medium is in the range from 0.005 to 1 part by weight per 100 parts by weight of the vinyl chloride monomer or the monomer mixture.

4. The improvement as claimed in claim 1 which further comprises coating the inner walls of the polymerization reactor with an organic polar compound.

* * * * *